Patented July 17, 1951

2,561,307

UNITED STATES PATENT OFFICE 2,561,307

TETRAHYDRO PYRAN AND FURAN DERIVATIVES AND PROCESS OF PRODUCING THE SAME

John W. Copenhaver, Easton, Pa., assignor to General Aniline & Film Corporation, New York, N. Y., a corporation of Delaware No Drawing. Application November 13, 1948, Serial No. 59,976

4 Claims. (Cl. 260—333)

This invention relates to the reaction of cyclic $\alpha, \beta$-unsaturated ethers with compounds selected from the group consisting of acetals, ketals, acylals and $\alpha$-chloroethers and their sulfur analogues, and the thus-obtained products.

In U. S. P. 2,165,962 and in my copending application Serial No. 762,213 filed July 19, 1947, now Patent No. 2,487,525, issued November 8, 1949, there is described a method of producing alkylidene diethers by the reaction of vinyl ethers with acetals or ketals.

I have now discovered that this and related reactions may be carried out under parallel conditions by employing in place of the open chain vinyl ethers disclosed in said patent or application, a cyclic $\alpha, \beta$-unsaturated ether, i. e. dihydropyran and dihydrofuran, or their $\alpha$-methyl derivatives.

The reaction involved in the present invention may be formulated as follows:

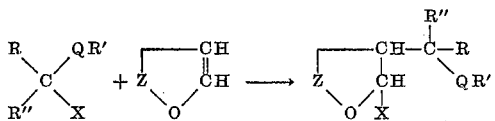

wherein Q is a chalcogen of atomic weight less than 33 (i. e. oxygen or sulfur), R and R' represent hydrocarbon (i. e. alkyl, aryl or aralkyl) and R'' represents hydrogen or hydrocarbon (i. e. alkyl, aryl or aralkyl), while X represents alkoxy, aryloxy, acyloxy or halogen, and Z is the residual alkylene radical of the dihydropyran or dihydrofuran ring or their $\alpha$-methyl derivatives, i. e.

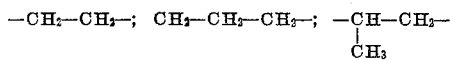

or

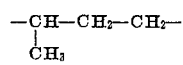

The reaction conditions employed in practicing the present invention parallel the known reaction conditions for producing alkylidene diethers by the reaction of acetals with open chain vinyl ethers. The reactants are mixed and the reaction will proceed at room temperature in the presence of a small amount of anhydrous acid reacting condensing agent, temperatures of from 0–100° C. being operative and the preferred temperature being within the range of 20–50° C. Only minor amounts of catalyst are required, and boron trifluoride or its diethyl ether complex has been found to be entirely satisfactory as a catalyst for the present reaction. However, other acid reacting condensing agents such as boron trichloride, stannic chloride, bismuth trichloride, titanic chloride, antimonic trichloride, sulfuric acid, and the like, may be employed if desired. Amounts of catalyst within the range of 0.0001 to 0.01 mol of catalyst per mol of acetal are preferred, particularly with boron trifluoride. However, somewhat smaller or larger amounts up to, say, 0.1 mol of catalyst per mol of acetal may be employed, if desired.

The details of the present invention will be apparent to those skilled in the art from a consideration of the following specific example:

Example 270 grams (3.0 mols) of dimethyl acetal and 0.2 ml. (0.0005 mols per mol of acetal) of boron fluoride etherate were charged to a 1-liter, 3-necked flask fitted with a sealed stirrer, condenser and thermometer and 84 grams (1 mol) of dihydropyran slowly added from a dropping funnel during over three-quarters of an hour. The reaction was slightly exothermic and the temperature was held at approximately 35° C. by periodic cooling. After all of the dihydropyran had been added, the reaction mixture was stirred for 4 hours and the catalyst was then neutralized by the addition of 1.0 ml. of diethanolamine. The reaction mixture was then distilled and after removal of the unreacted acetal there was recovered 62% of the theoretical yield of 2 - methoxy - 3 - (1 - methoxyethyl) - tetrahydropyran (boiling point 100° C./28 mm., $n_D^{25}$ 1.4375.

Analysis calculated for $C_9H_{18}O_3$: C, 62.04; H, 10.41. Found: C, 62.09; H, 10.22.

It will be understood that the foregoing example is illustrative of a preferred embodiment of the invention and that various modifications thereof will suggest themselves to those skilled in the art. In particular, the conditions of reaction may be varied within the ranges given above and other reactants of the type indicated by the equation given above may be substituted for the dimethyl acetal or the dihydropyran employed in this example to produce correspondingly different products. Thus, in place of the dihydropyran employed in the example, there may be used dihydrofuran, $\alpha$-methyl dihydropyran or $\alpha$-methyl dihydrofuran.

Likewise, in place of dimethyl acetal, other lower alkyl acetals such as diethyl acetal, methylethyl acetal, dimethyl ketal, dimethyl butyral, dimethyl benzal, dibutyl acetal, butyl methyl acetal, and the like, may be employed. While the products obtained by employing the lower alkyl acetals and ketals of the type mentioned immediately above are generally preferred, compounds in which the group X in the equation given above is aryloxy, acyloxy or halogen and in which Q is sulfur, may be employed if desired. As examples of such compounds may be mentioned: α-methoxyethyl acetate, α-ethoxyethyl propionate, ethyl thioethyl acetal, α-chloroethyl ethyl ether, benzyl methyl acetal, phenyl ethyl acetal, naphthyl thioethyl acetal and the like.

As indicated by the foregoing specific example, it is preferable to employ some excess of acetal in carrying out the present process. While the process is operative through a wide range of proportions of the reactants including proportions in which the dihydropyran or dihydrofuran is in excess, it has been found that the best yield of the 1:1 adduct of the acetal and cyclic α, β-unsaturated ether is obtained when the acetal or its equivalent is employed in excess. From 2 to 4 mols of acetal per mol of cyclic unsaturated ether have been found to give the best yield of the 1:1 adduct.

Whenever the proportion of cyclic unsaturated ether has been increased above this range, it has been noticed that some higher molecular weight products are formed, apparently by the reaction of the ether with the 1:1 adduct.

I claim:

1. The process which comprises reacting a lower alkyl acetal, with an α, β-unsaturated cyclic ether selected from the group consisting of dihydropyran and dihydrofuran and their α-methyl homologues at a temperature of from 0–100° C. in the presence of an acid reacting catalyst.

2. The process as defined in claim 1, wherein an excess of acetal is employed.

3. The process as defined in claim 2, wherein from 2 to 4 mols of acetal are employed per mol of cyclic ether.

4. 2 - methoxy - 3(1 - methoxyethyl) - tetrahydropyran.

JOHN W. COPENHAVER.

No references cited.